United States Patent
Aoki

(10) Patent No.: US 11,307,058 B2
(45) Date of Patent: Apr. 19, 2022

(54) SCALE AND MANUFACTURING METHOD OF THE SAME

(71) Applicant: MITUTOYO CORPORATION, Kanagawa (JP)

(72) Inventor: Toshihiko Aoki, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 119 days.

(21) Appl. No.: 16/220,368

(22) Filed: Dec. 14, 2018

(65) Prior Publication Data
US 2019/0186957 A1    Jun. 20, 2019

(30) Foreign Application Priority Data
Dec. 18, 2017   (JP) ............... JP2017-241624

(51) Int. Cl.
| | | |
|---|---|---|
| *G01D 5/347* | (2006.01) | |
| *G02B 5/18* | (2006.01) | |
| *G01D 5/38* | (2006.01) | |
| *G02B 7/00* | (2021.01) | |

(52) U.S. Cl.
CPC ......... *G01D 5/34707* (2013.01); *G01D 5/38* (2013.01); *G02B 5/1857* (2013.01); *G02B 5/1861* (2013.01); *G02B 7/008* (2013.01)

(58) Field of Classification Search
CPC ...... G01D 5/34707; G01D 5/38; G02B 7/008; G02B 5/1861; G02B 5/1866
See application file for complete search history.

(56) References Cited

U.S. PATENT DOCUMENTS

| | | | |
|---|---|---|---|
| 5,696,584 A | 12/1997 | Franz et al. | |
| 5,786,931 A | 7/1998 | Speckbacher et al. | |
| 2001/0046055 A1 | 11/2001 | Speckbacher et al. | |
| 2003/0076594 A1* | 4/2003 | Kramer .................... | G03F 7/40 359/569 |
| 2003/0124313 A1* | 7/2003 | Nagano ................ | G02B 5/1852 428/156 |
| 2005/0207013 A1 | 9/2005 | Kanno et al. | |
| 2005/0275944 A1* | 12/2005 | Wang ..................... | G02B 5/18 359/576 |
| 2008/0247044 A1 | 10/2008 | Kuwabara | |

(Continued)

FOREIGN PATENT DOCUMENTS

| | | |
|---|---|---|
| CN | 104515468 | 4/2015 |
| CN | 106989666 | 7/2017 |

(Continued)

OTHER PUBLICATIONS

Chinese Office Action dated Nov. 29, 2021, English translation included,, 16 pages.

(Continued)

*Primary Examiner* — Kimberly N. Kakalec
(74) *Attorney, Agent, or Firm* — Rankin, Hill & Clark LLP

(57) ABSTRACT

A scale includes: a substrate that is made of low expansion glass of which a thermal expansion coefficient is $1\times10^{-7}$/K or less; and scale gratings having a plurality of gratings that are arranged on a first face of the substrate at a predetermined interval and are made of a transparent inorganic material of which a thermal expansion coefficient is more than $1\times10^{-7}$/K.

9 Claims, 8 Drawing Sheets

(56) References Cited

U.S. PATENT DOCUMENTS

| | | | |
|---|---|---|---|
| 2015/0015957 A1* | 1/2015 | Kawasaki | G02B 5/1852 |
| | | | 359/566 |
| 2015/0098090 A1 | 4/2015 | Holzapfel et al. | |
| 2015/0276998 A1* | 10/2015 | Miller | B29D 11/00769 |
| | | | 359/361 |
| 2016/0216103 A1 | 7/2016 | Speckbacher et al. | |
| 2017/0211923 A1 | 7/2017 | Speckbacher et al. | |

FOREIGN PATENT DOCUMENTS

| | | |
|---|---|---|
| EP | 0 773 458 | 5/1997 |
| JP | 04-051201 | 2/1992 |
| JP | 08-254607 | 10/1996 |
| JP | 08-286020 | 11/1996 |
| JP | 09-171104 | 6/1997 |
| JP | 10-318793 | 12/1998 |
| JP | 2005-114717 | 4/2005 |
| JP | 2005-308718 | 11/2005 |
| JP | 2006-053279 | 2/2006 |
| JP | 2008-045931 | 2/2008 |
| JP | 2008-242332 | 10/2008 |
| JP | 2011-047867 | 3/2011 |
| JP | 2016-138879 | 8/2016 |
| JP | 2017-151093 | 8/2017 |

OTHER PUBLICATIONS

Japanese Office Action dated Sep. 21, 2021, English translation included, 12 pages.

* cited by examiner

SCALE AND MANUFACTURING METHOD OF THE SAME

CROSS-REFERENCE TO RELATED APPLICATION

This application is based upon and claims the benefit of priority of the prior Japanese Patent Application No. 2017-241624, filed on Dec. 18, 2017, the entire contents of which are incorporated herein by reference.

FIELD

A certain aspect of embodiments described herein relates to a scale and a manufacturing method of a scale.

BACKGROUND

There is disclosed a technology in which a nanoimprint is used as a forming method of a diffraction grating of high accuracy (for example, see Japanese Patent Application Publication No. H04-51201).

SUMMARY

However, in the technology of Japanese Patent Application Publication No. H04-51201, resin is used as gratings. In this case, sufficient environment resistance, sufficient chronological stability and so on are not achieved. Therefore, the gratings may be chronologically degraded. And so, it is thought that a diffraction grating is formed by directly processing a substrate such as synthetic quartz. However, a thermal expansion coefficient of the synthetic quartz is approximately $0.5 \times 10^{-6}$/K that is a relatively high value. Therefore, when the diffraction grating is used as a high accuracy scale, influence of the changing of the environment temperature is enlarged. And so, low expansion glass called as zero expansion glass may be used as a substrate. However, it is difficult to directly process the zero expansion glass.

In one aspect of the present invention, it is an object to provide a scale that has characteristic in which chronological degradation is suppressed and influence of changing of an environment temperature is suppressed, and a manufacturing method of the scale.

According to an aspect of the present invention, there is provided a scale including: a substrate that is made of low expansion glass of which a thermal expansion coefficient is $1 \times 10^{-7}$/K or less; and scale gratings having a plurality of gratings that are arranged on a first face of the substrate at a predetermined interval and are made of a transparent inorganic material of which a thermal expansion coefficient is more than $1 \times 10^{-7}$/K.

According to another aspect of the present invention, there is provided a manufacturing method of a scale including: forming a layer to be etched on a substrate made of low expansion glass of which a thermal expansion coefficient is $1 \times 10^{-7}$/K or less, the layer to be etched being made of a transparent inorganic material of which a thermal expansion coefficient is more than $1 \times 10^{-7}$/K; and forming a plurality of gratings arranged on the substrate at a predetermined interval, by etching the layer to be etched.

DESCRIPTION OF EMBODIMENTS

The following is a description of embodiments, with reference to the accompanying drawings.

First Embodiment

Figure 1A:
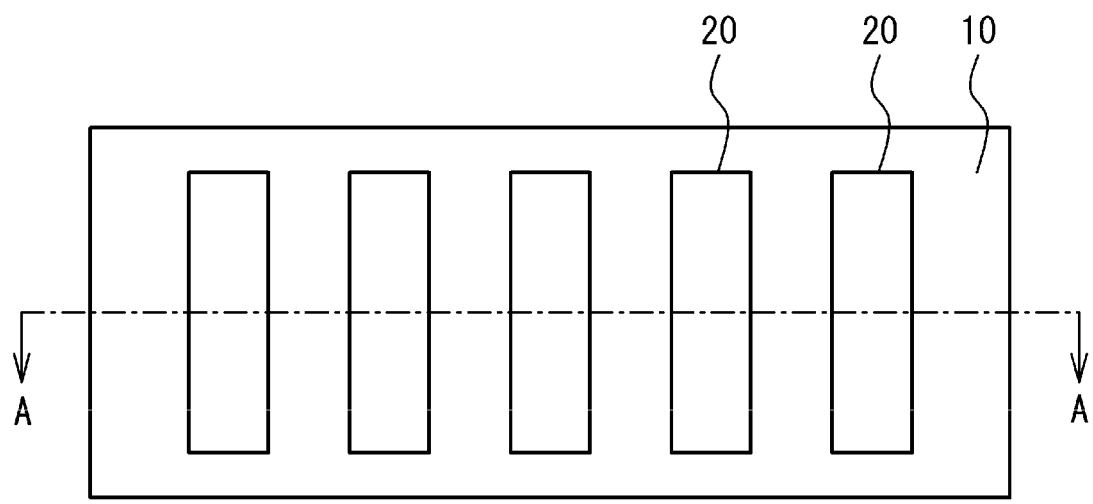
FIG. 1A illustrates a plan view of a scale of a first embodiment.
Figure 1B:
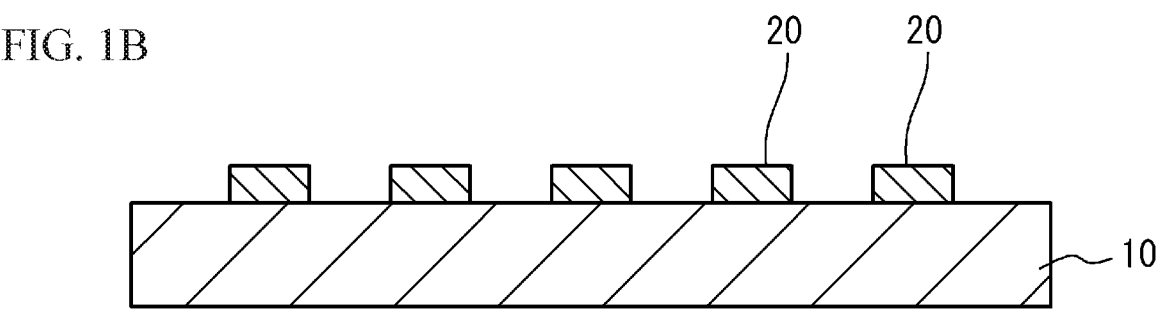
FIG. 1B illustrates a cross sectional view taken along a line A-A of FIG. 1A.

FIG. 1A illustrates a plan view of a scale 100 in accordance with a first embodiment. FIG. 1B illustrates a cross sectional view taken along a line A-A of FIG. 1A. As illustrated in FIG. 1A and FIG. 1B, the scale 100 has scale gratings 20 including a plurality of gratings that are arranged on a first face of a substrate 10 at a predetermined interval. With the structure, the scale 100 achieves optical characteristic such as optical transparency or optical reflection characteristic.

The substrate 10 is made of zero expansion glass. The zero expansion glass is low expansion glass of which a thermal expansion coefficient is $1 \times 10^{-7}$/K or less. For example, the zero expansion glass may be made by dispersing crystallized glass into amorphous glass. CLEARCE-RAM (registered trademark), Zerodur (registered trademark) may be used as the zero expansion glass.

The scale gratings 20 have only to be a transparent inorganic material of which the thermal expansion coefficient is more than $1 \times 10^{-7}$/K. Transparent oxide such as glass, $SiO_2$ (silicon dioxide) or $TiO_2$ (titanium dioxide) or transparent fluoride such as $MgF_2$ (magnesium fluoride) may be used as the transparent inorganic material.

In the embodiment, the substrate 10 is made of the zero expansion glass. Therefore, the thermal expansion coefficient of the scale 100 is small. And, the scale 100 is hardly subjected to influence of changing of an environmental temperature. The scale gratings 20 are made of the transparent inorganic material. In this case, in comparison to a case where scale gratings are made of resin, sufficient environment resistance, chronological stability and so on are achieved. Thus, chronological degradation is suppressed. It is therefore possible to provide the scale 100 having characteristic in which chronological degradation is suppressed and the influence of the changing of the environment temperature is suppressed.

It is preferable that a relationship of $nf \leq ns$ is satisfied, when a diffraction index of the scale gratings 20 is "nf" and a diffraction index of the substrate 10 is "ns". When the relationship is satisfied, influence of changing of a grating height of a diffraction grating is suppressed. It is therefore possible to improve a yield or throughput of grating forming.

Figure 2:
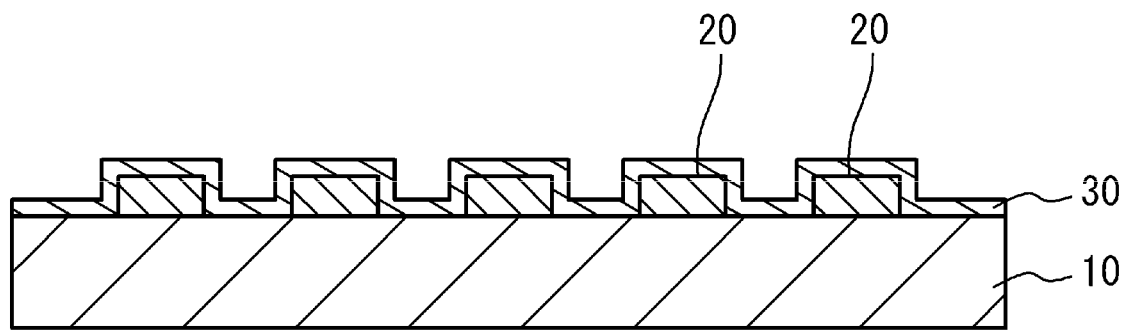
FIG. 2 illustrates another example of a scale of a first embodiment.

When the scale 100 is used as a reflection type diffraction grating is used, a reflection layer 30 may cover an exposed portion of the first face of the substrate 10 and the scale gratings 20 as illustrated in FIG. 2. For example, the reflection layer 30 covers all of the scale gratings 20. The reflection layer 30 may be a metal material such as Cr (chromium), $TiSi_2$ (titanium silicide), Ti (titanium), Au (gold), Al (aluminum) or the like.

Figure 3A:
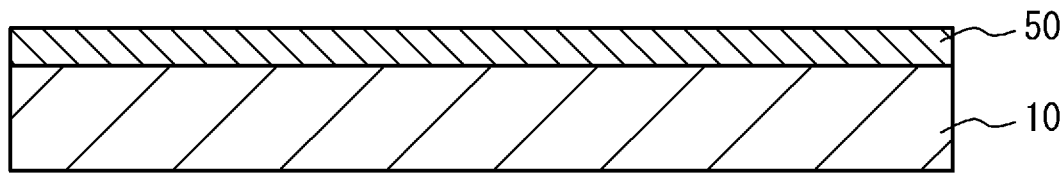
FIG. 3A to FIG. 3D illustrate a manufacturing method of a scale.

FIG. 3A to FIG. 3D illustrate a manufacturing method of the scale 100. As illustrated in FIG. 3A, a layer 50 to be etched is formed on the first face of the substrate 10. The layer 50 to be etched is a layer for forming the scale gratings 20. Therefore, a material of the layer 50 to be etched is the same as that of the scale gratings 20. It is possible to form the layer 50 to be etched by a physical vapor deposition method such as a vacuum deposition or a sputtering. It is possible to form the layer 50 to be etched by a chemical vapor deposition method. It is possible to form the layer 50 to be etched by a wet coating such as SOG (Spin On Glass).

Figure 3B:
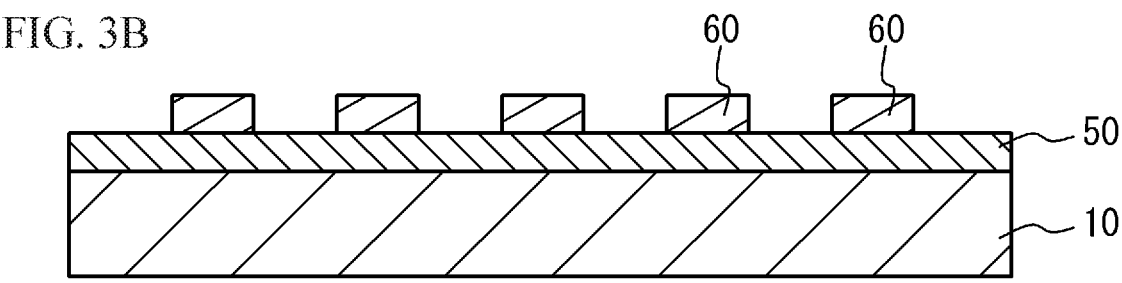
Figure 3C:
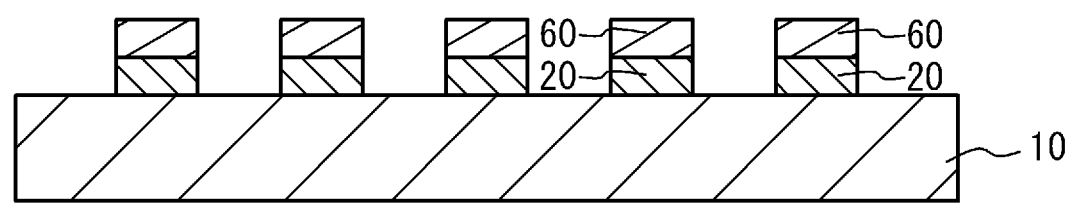
Figure 3D:
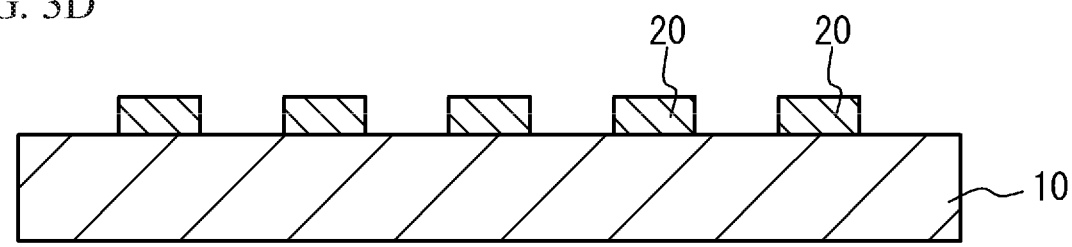

Next, as illustrated in FIG. 3B, resist patterns 60 are formed on the layer 50 to be etched at a predetermined interval. The resist patterns 60 have the same pattern as the scale gratings 20. It is possible to form the resist patterns 60 by exposing and developing of a resist layer with use of a predetermined mask. Next, as illustrated in FIG. 3C, the resist patterns 60 are used as a mask. And the layer 50 to be etched is etched (etching process). In this case, it is possible to expose the portion of the first face of the substrate 10 other than the scale gratings 20. Thus, the scale gratings 20 are formed. Next, as illustrated in FIG. 3D, the resist patterns 60 are removed. Therefore, the scale 100 is manufactured. And the layer 50 to be etched may be processed after forming a mask layer, of which an etch selectivity is different from that of the layer 50 to be etched, on the layer 50 to be etched and processing the resist patterns 60 with use of the mask layer, in order to improve etching resistance of the masks.

In the manufacturing method, an etching rate of the substrate 10 is smaller than that of the layer 50 to be etched, due to a difference of chemical stability. Therefore, when the layer 50 to be etched is etched, the scale gratings 20 are formed on the substrate 10. The substrate 10 is made of the zero expansion glass. And the scale gratings 20 are made of the transparent inorganic material other than the zero expansion glass. It is therefore possible to manufacture the scale 100 having characteristic in which the chronological degradation is suppressed and the influence of the changing of the environment temperature is suppressed.

Second Embodiment

Figure 4A:
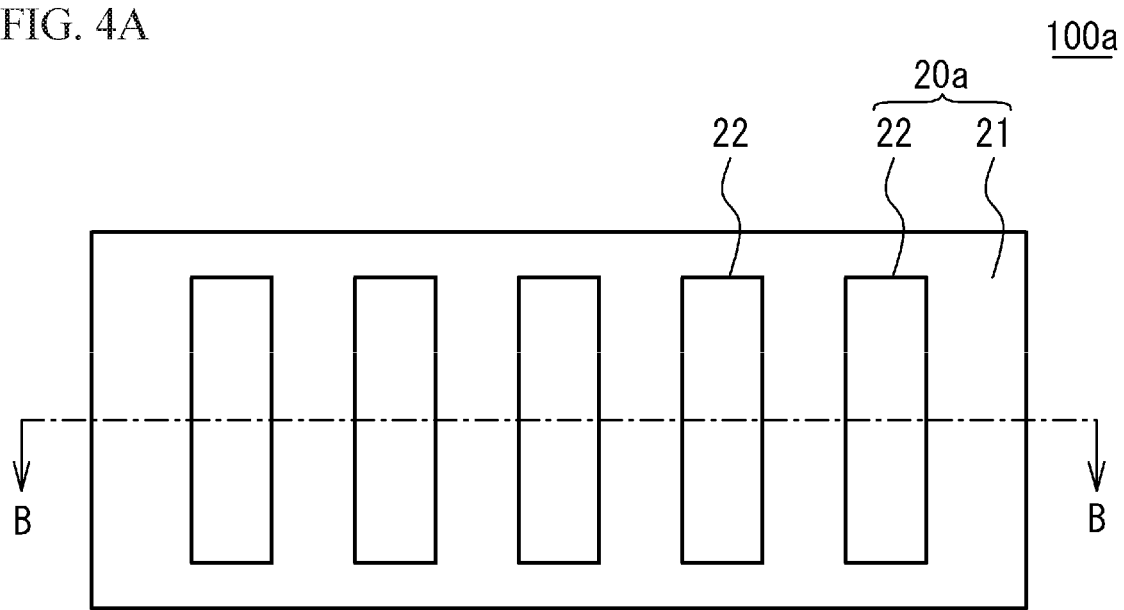
FIG. 4A illustrates a plan view of a scale of a second embodiment.
Figure 4B:
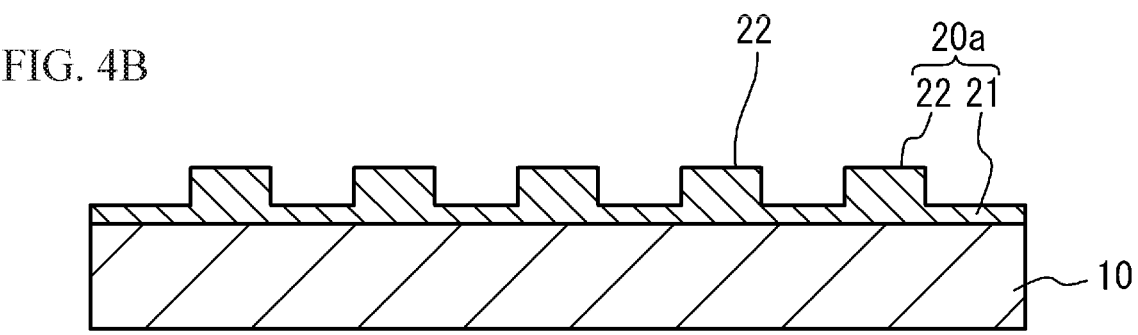
FIG. 4B illustrates a cross sectional view taken along a line B-B of FIG. 4A.

FIG. 4A illustrates a plan view of a scale 100a in accordance with a second embodiment. FIG. 4B illustrates a cross sectional view taken along a line B-B of FIG. 4A. As illustrated in FIG. 4A and FIG. 4B, the scale 100a is different from the scale 100 of the first embodiment in a point that scale gratings 20a are provided instead of the scale gratings 20. The scale gratings 20a are different from the scale gratings 20 in a point that the gratings of the scale gratings 20a are connected at a bottom. That is, the scale gratings 20a have a structure in which a plurality of gratings 22 are provided on a layer-shaped portion 21 on the first face of the substrate 10. The layer-shaped portion 21 covers an overall of the first face of the substrate 10. A material of the layer-shaped portion 21 is the same as that of the gratings 22. The material of the layer-shaped portion 21 and the gratings 22 is the same as that of the scale gratings 20 of the first embodiment.

In the embodiment, the substrate 10 is made of the zero expansion glass. Therefore, the thermal expansion coefficient of the scale 100a is small. And, the scale 100a is hardly subjected to influence of changing of an environmental temperature. The scale gratings 20a are made of the transparent inorganic material. In this case, in comparison to a case where scale gratings are made of resin, sufficient environment resistance, chronological stability and so on are achieved. Thus, chronological degradation is suppressed. It is therefore possible to provide the scale 100a having characteristic in which the chronological degradation is suppressed and the influence of the changing of the environment temperature is suppressed. Moreover, each of the gratings 22 is connected by the layer-shaped portion 21. Therefore, in comparison to a case where the layer-shaped portion 21 is not formed, it is possible to suppress the changing of the diffraction index with respect to a light entering the scale 100a. Thus, reflected lights are intensified with each other by interference effect. It is therefore possible to enlarge diffraction efficiency.

It is preferable that a relationship of nf≤ns is satisfied, when a diffraction index of the layer-shaped portion 21 and the scale gratings is "nf" and a diffraction index of the substrate 10 is "ns". When the relationship is satisfied, influence of changing of a grating height of a diffraction grating is suppressed. It is therefore possible to improve a yield or throughput of grating forming.

Figure 5:
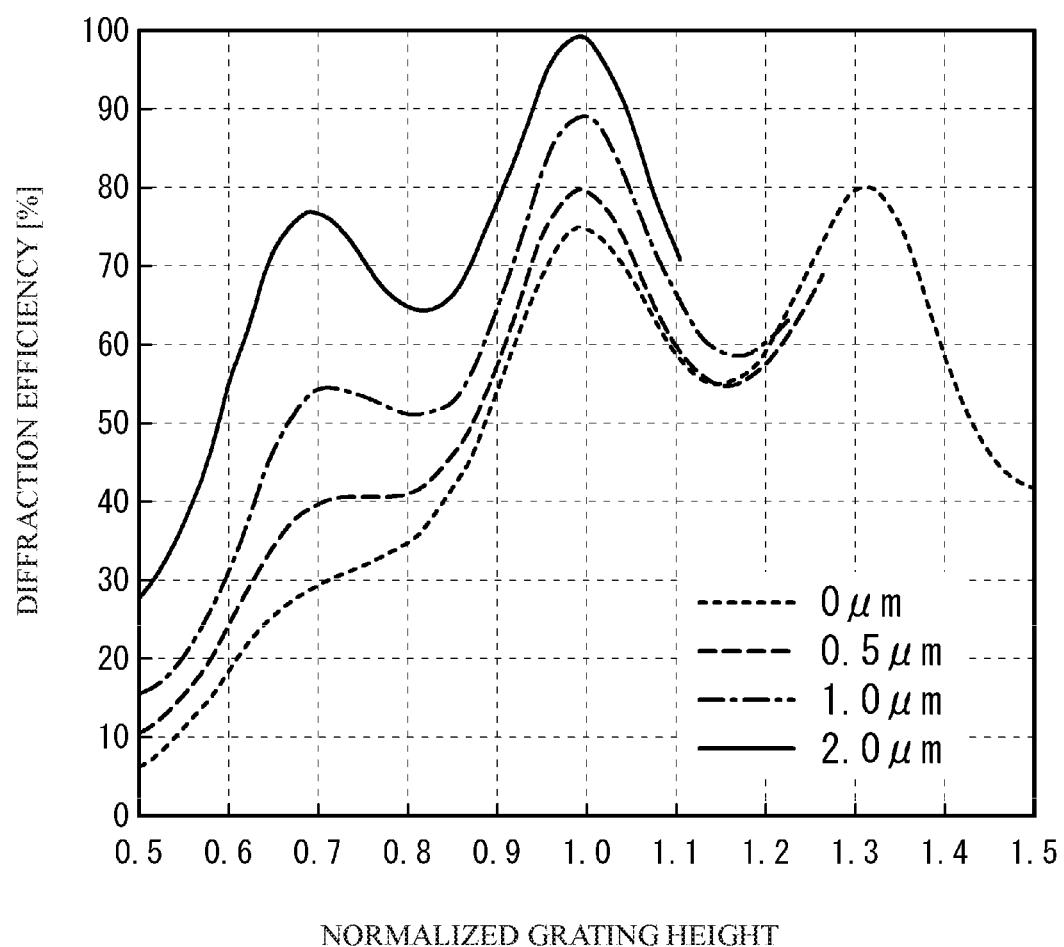
FIG. 5 illustrates simulation results indicating a relationship between a thickness of a layer-shape portion and diffraction efficiency.

FIG. 5 illustrates simulation results indicating a relationship between the thickness of the layer-shaped portion 21 and the diffraction efficiency. In the simulation, the diffraction index "nf" is 1.456 (diffraction index of $SiO_2$), and the diffraction index "ns" is 1.546 (diffraction index of CLEARCERAM (registered trademark)). In FIG. 5, "0 μm" indicates the case where the layer-shaped portion 21 is not provided. "0.5 μm", "1.0 μm" and "2.0 μm" respectively indicate that the thickness of the layer-shaped portion 21 is "0.5 μm", "1.0 μm" and "2.0 μm". A horizontal axis indicates a normalized value of the height of the gratings 22. As illustrated in FIG. 5, the diffraction efficiency of a case where the layer-shaped portion 21 is provided is larger than a case where the layer-shaped portion 21 is not provided (0 μm). From the result of FIG. 5, it is preferable that the thickness of the layer-shaped portion 21 is 0.5 μm or more. For example, the thickness of the layer-shaped portion 21 may be 0.5 μm or more and 2.5 μm or less or may be 0.5 μm or more and 2.0 μm or less.

Figure 6:
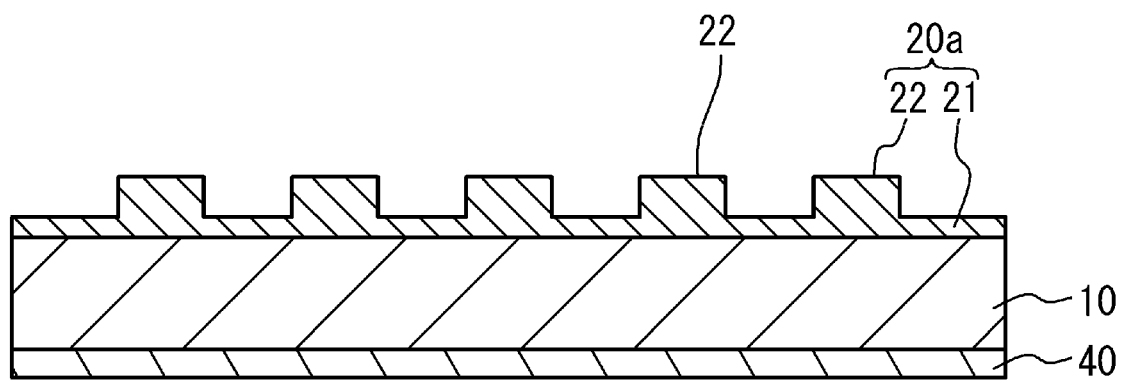
FIG. 6 illustrates another example of a scale of a second embodiment.

When the scale gratings 20a have the layer-shaped portion 21, stress may occur on the first face side of the substrate 10. And so, as illustrated in FIG. 6, a stress suppression layer 40 may be provided in order to suppress the stress. For example, the stress suppression layer 40 is provided on a second face (facing with the first face) of the substrate 10. When the scale gratings 20a cause compression stress to the substrate 10, the stress suppression layer 40 is made of a material for generating compression stress. When the scale gratings 20a cause tensile stress to the substrate 10, the stress suppression layer 40 is made of a material for generating tensile stress. For example, the stress suppression layer 40 is made of a transparent material such as an oxide, when the scale 100a is used as a transparent type diffraction grating. The material of the stress suppression layer 40 is not limited when the scale 100a is used as a reflection type diffraction grating.

Figure 7A:
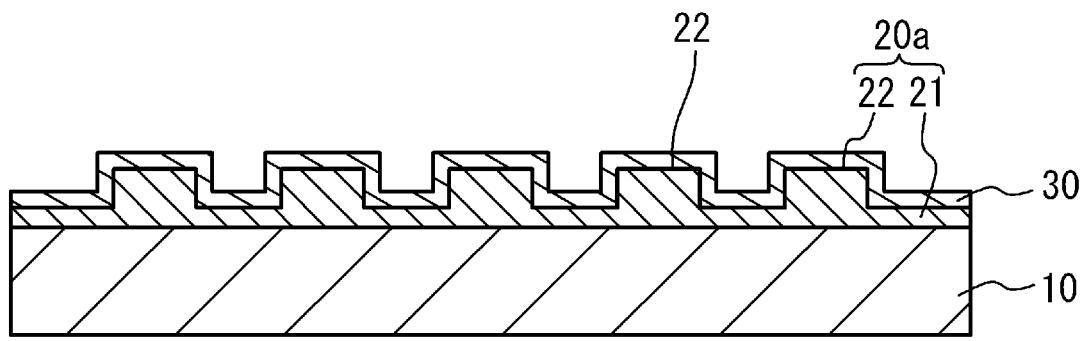
FIG. 7A and FIG. 7B illustrate another example of a scale of a second embodiment.

When the scale 100a is used as a reflection type diffraction grating, the exposed portion of the first face of the substrate and the scale gratings 20a may be covered by the reflection layer 30 descried in the first embodiment, as illustrated in FIG. 7A.

Figure 7B:
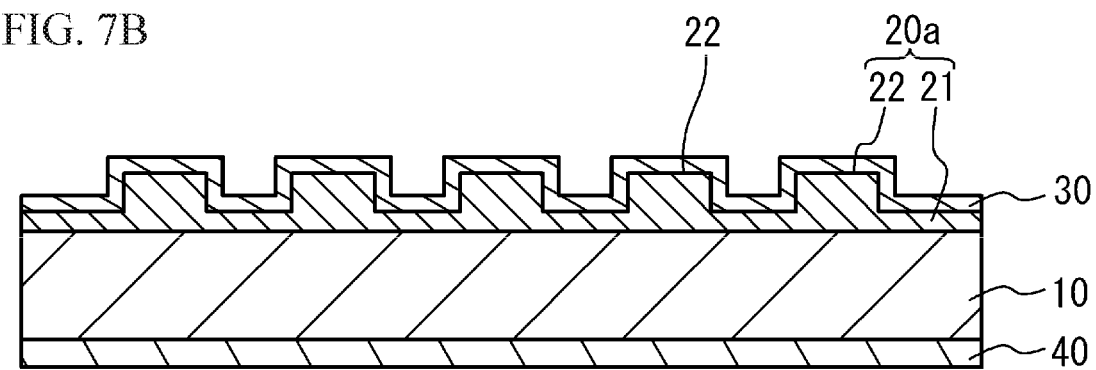

Alternatively, as illustrated in FIG. 7B, the scale gratings 20a may be covered by the reflection layer 30, and the stress suppression layer 40 may be provided on the second face of the substrate 10. In this case, when the scale gratings 20a and the reflection layer 30 totally cause compression stress to the substrate 10, the stress suppression layer 40 is made of a material for generating compression stress. When the scale gratings 20a and the reflection layer 30 totally cause tensile stress to the substrate 10, the stress suppression layer 40 is made of a material for generating tensile stress.

Figure 8A:
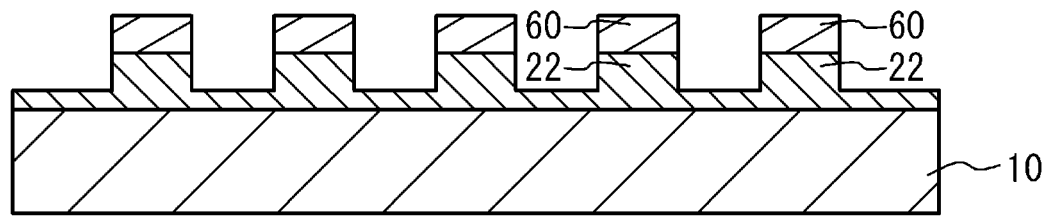
FIG. 8A and FIG. 8B illustrate a manufacturing method of a scale.
Figure 8B:
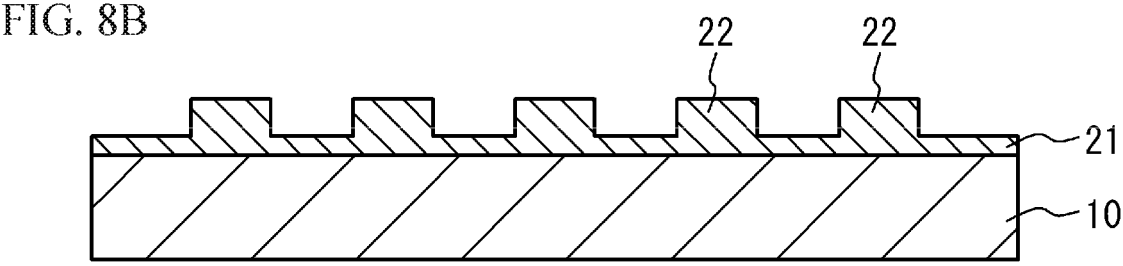

FIG. 8A and FIG. 8B illustrate a manufacturing method of the scale 100a. As described in FIG. 3A and FIG. 3B, the layer 50 to be etched is formed on the first face of the substrate 10. The resist patterns 60 are formed on the layer 50 to be etched at a predetermined interval. Next, as illustrated in FIG. 8A, the resist patterns 60 are used as masks, and the layer 50 to be etched is subjected to an etching process (etching process). In this case, the etching process is finished so that the first face of the substrate 10 is not exposed. That is, the etching process is finished before a portion other than the gratings is exposed on the first face of the substrate 10. Thus, the gratings 22 are formed, and the layer-shaped portion 21 is formed. That is, it is possible to form the scale gratings 20a. Next, as illustrated in FIG. 8B, the resist patterns 60 are removed. With the processes, the scale 100a is manufactured. And the layer 50 to be etched may be processed after forming a mask layer, of which an etch selectivity is different from that of the layer 50 to be etched, on the layer 50 to be etched and processing the resist patterns 60 with use of the mask layer, in order to improve etching resistance of the masks.

In the manufacturing method of the second embodiment, it is possible to form the gratings 22 while the layer-shaped portion 21 is left. Thus, it is possible to form the scale gratings 20a on the substrate 10. The substrate 10 is made of the zero expansion glass, and the scale gratings 20a are made of a transparent inorganic material other than the zero expansion material. It is therefore possible to manufacture the scale 100a having characteristic in which chronological degradation is suppressed and influence of changing of an environment temperature is suppressed. And, it is possible to suppress the changing of the diffraction index with respect to a light entering the scale 100a, because the gratings 22 are connected by the layer-shaped portion 21. It is therefore possible to enlarge the diffraction efficiency.

The present invention is not limited to the specifically disclosed embodiments and variations but may include other embodiments and variations without departing from the scope of the present invention.

What is claimed is:

1. A scale comprising:
a substrate that is made of low expansion glass of which a thermal expansion coefficient is $1\times10^{-7}$/K or less; and
scale gratings having a plurality of gratings that are arranged on a first face of the substrate at a predetermined interval and are made of a transparent inorganic material of which a thermal expansion coefficient is more than $1\times10^{-7}$/K,
wherein the scale gratings have a structure in which the plurality of gratings are provided on a layer-shaped portion made of the transparent inorganic material, on the first face of the substrate,
wherein the layer-shaped portion is directly provided on the first face of the substrate, and
wherein the layer-shaped portion has a thickness of more than 0.5 µm and 2.5 µm or less.

2. The scale as claimed in claim 1, wherein a diffraction index of the transparent inorganic material is a diffraction index of the low expansion glass or less.

3. The scale as claimed in claim 1, wherein the transparent inorganic material is $SiO_2$ or $MgF_2$.

4. The scale as claimed in claim 1, further comprising:
a stress suppression layer that is provided on a second face of the substrate and suppresses stress of the layer-shaped portion applied to the substrate, the second face facing the first face.

5. The scale as claimed in claim 4,
wherein the scale gratings are covered by a reflection layer.

6. The scale as claimed in claim 5,
wherein the reflection layer is a metal layer.

7. The scale as claimed in claim 1,
wherein the layer-shaped portion has the thickness of 1.0 µm or more and 2.5 µm or less.

8. The scale as claimed in claim 1,
wherein the substrate is an ultra-low expansion glass-ceramics, and
wherein the scale gratings are $SiO_2$.

9. The scale as claimed in claim 1, wherein the transparent inorganic material is $MgF_2$.

* * * * *